United States Patent
Sakamoto et al.

(10) Patent No.: US 6,233,134 B1
(45) Date of Patent: May 15, 2001

(54) ANTI-REDUCING DIELECTRIC CERAMIC COMPOSITION AND MONOLITHIC CERAMIC CAPACITOR USING THE SAME

(75) Inventors: Norihiko Sakamoto, Shimane-ken; Tomoo Motoki, Shiga-ken; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/369,658

(22) Filed: Aug. 5, 1999

(30) Foreign Application Priority Data

Aug. 7, 1998 (JP) .................................................. 10-224223

(51) Int. Cl.$^7$ ....................................................... H01G 4/06
(52) U.S. Cl. ........................ 361/311; 361/321.5; 501/134
(58) Field of Search ............ 361/311–313, 321.1–321.5, 361/322; 501/134–138

(56) References Cited

U.S. PATENT DOCUMENTS 4,700,266   10/1987   Chazono et al. .

4,859,641   8/1989   Fujino et al. .................... 501/136

FOREIGN PATENT DOCUMENTS

0913843A1   * 5/1999   (EP) .

* cited by examiner

*Primary Examiner*—Anthony Dinkins
(74) *Attorney, Agent, or Firm*—Ostrolenk, Faber, Gerb & Soffen, LLP

(57) ABSTRACT

An anti-reducing dielectric ceramic composition having a dielectric constant of 100 or higher and excellent reliability during a life measuring test under a high temperature load and a monolithic ceramic capacitor formed by using the improved anti-reducing dielectric ceramic composition. The composition is a composite oxide represented by the composition formula $(Ca_{1-x}Sr_x)_m(Zr_{1-y}Ti_y)O_3$, $0 \leq x < 0.5$, $0.60 < y \leq 0.85$ and $0.85 < m < 1.30$ as a main component. Every 100 mols of the main component is mixed with at least one of a manganese compound and a magnesium compound incorporated as an accessory component in a range of about 0.1 to 6 mols, by calculatively converting the manganese compound into MnO and the magnesium compound into MgO. The composition may further contain a sintering auxiliary material such as $SiO_2$.

20 Claims, 1 Drawing Sheet

ANTI-REDUCING DIELECTRIC CERAMIC COMPOSITION AND MONOLITHIC CERAMIC CAPACITOR USING THE SAME

BACKGROUND OF THE INVENTION

1. Field of the Invention

The present invention relates to a anti-reducing dielectric ceramic composition and a monolithic ceramic capacitor using the dielectric ceramic composition.

2. Description of the Related Art

When a dielectric material mainly containing a titanate is used to form a monolithic ceramic capacitor, there has been the problem that when such a dielectric material is sintered under a condition of a low concentration oxygen partial pressure (neutral or reductive atmosphere), the dielectric material is undesirably reduced and hence undesirably becomes a semi-conductor. Because of this, in order to form internal electrodes, it is necessary to employ a noble metal such as palladium and platinum which will not melt under the sintering temperature, nor will it cause the dielectric ceramic material to be converted to a semi-conductor and itself be oxidized under a high concentration oxygen partial pressure. As a result, it is difficult to manufacture a monolithic ceramic capacitor with a low cost.

It is usually desired to use, as an internal electrode material, inexpensive base metals such as nickel and copper. However, when such a base metal is used as an internal electrode material and is sintered under conventional conditions, said electrode material is oxidized. As a result, it is impossible to provide the desired function of an electrode. For this reason, in order for such base metal to be used as an internal electrode material, it is necessary to employ a dielectric material having an excellent dielectric property with its ceramic layer having resistance against becoming a semiconductor even under a neutral or reductive atmosphere having a low concentration oxygen partial pressure. In order to meet such a requirement, Japanese laid-open patent application Nos. 63-289707 and 63-224106 suggest an improved dielectric material which is $(Ca_{1-x}Sr_x)(Zr_{1-y}Ti_y)O_3$ composition. By using such improved dielectric material, it has become possible to obtain a dielectric ceramic which is not converted into a semiconductor even when being sintered in a reductive atmosphere, thereby rendering it possible to manufacture a monolithic ceramic capacitor using a base metal material such as nickel or copper for forming internal electrode.

With the anti-reducing dielectric ceramic composition disclosed in the above Japanese laid-open patent application No. 63-289707, there is a problem that although it has excellent capacity and temperature characteristics, its dielectric constant is as low as 46. With the anti-reducing dielectric ceramic composition disclosed in the above Japanese laid-open patent application No. 63-224106, there is a problem that if the thickness of laminated ceramic body is made quite thin for the purpose of producing a monolithic ceramic capacitor compact in size but large in capacity, it is difficult to ensure the desired reliability during a life measuring test under a high temperature load.

SUMMARY OF THE INVENTION

The present provides an improved anti-reducing dielectric ceramic composition having a dielectric constant of 100 or higher and an excellent reliability during a life test under a high temperature load, and provides a monolithic ceramic capacitor formed by using the improved anti-reducing dielectric ceramic composition.

In accordance with one aspect of the present invention, a anti-reducing dielectric ceramic composition comprises a composite oxide containing as metal elements M (M: Ca or Ca and Sr), Zr and Ti, when represented by a composition formula $(Ca_{1-x}Sr_x)_m(Zr_{1-y}Ti_y)O_3$, the values of x, y, and m satisfy the ranges of $0 \leq x < 0.5$, $0.60 < y \leq 0.85$, $0.85 < m < 1.30$ as a main component, and at least one of a manganese compound and a magnesium compound incorporated as an accessory component in a range of about 0.1 to 6 mols in terms of MnO and MgO, respectively, for every 100 mols of the main component.

The composition may further contain a sintering aid agent. The sintering aid agent may preferably contain at least one of Si and B. Further, the sintering aid agent may be $SiO_2$.

Moreover, the sintering aid agent may be a member of the $Li_2O$—(Si, Ti)$O_2$—MO series (where MO is at least one of $Al_2O_3$ and $ZrO_2$).

In addition, the sintering aid agent may be a member of the $SiO_2$—$TiO_2$—XO series (where XO is at least one substance selected from a group consisting of BaO, SrO, CaO, MgO, ZnO and MnO). Preferably, the agent is at least one selected from $Al_2O_3$ and $ZrO_2$.

Further, the sintering auxiliary material may be a member of the $Li_2O$—$B_2O_3$—(Si, Ti)$O_2$ series. Preferably, the sintering auxiliary material contains at least one substance selected from $Al_2O_3$ and $ZrO_2$.

Moreover, the agent may be a member of the $B_2O_3$—$Al_2O_3$—XO series (where XO is at least one substance selected from a group consisting of BaO, SrO, CaO, MgO, ZnO and MnO).

The content of the agent may be about 20 parts by weight or lower with respect to 100 parts by weight in total of the main component and the accessory component.

A monolithic ceramic capacitor of the present invention includes a plurality of dielectric ceramic layers, internal electrodes formed between the dielectric ceramic layers, and external electrodes electrically connected with the internal electrodes, and is characterized in that the dielectric ceramic layers are made of the above dielectric ceramic compositions, and each of the internal electrodes contains a base metal as its main component. The base metal may preferably be nickel or copper.

DESCRIPTION OF THE PREFERRED EMBODIMENTS

Figure 1:
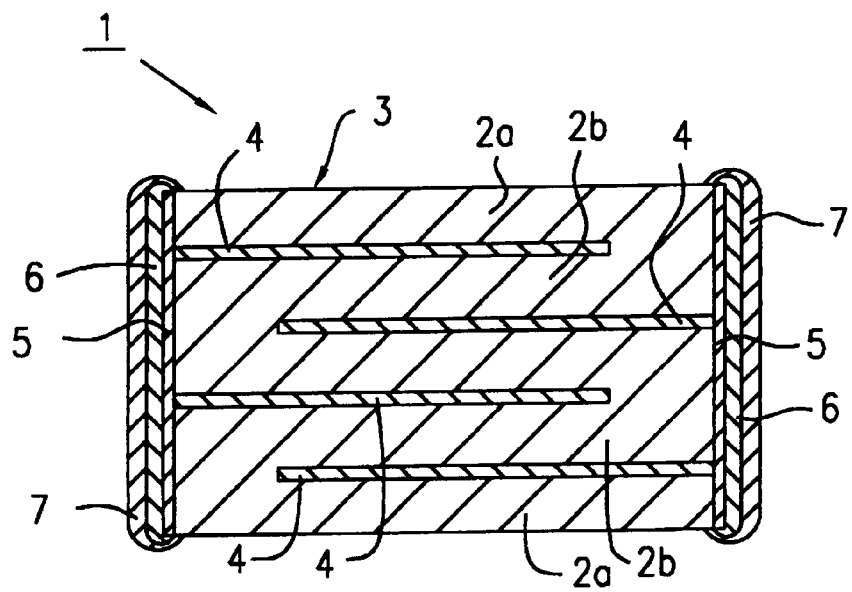
FIG. 1 is a cross sectional view showing a monolithic ceramic capacitor according to the present invention.
Figure 2:
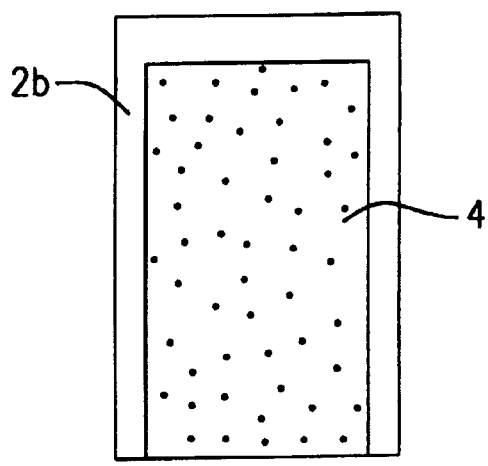
FIG. 2 is a plan view of a ceramic green sheet according to the present invention.

Preferred embodiments of the present invention will be described in accordance with several working examples.

EXAMPLE 1

At first, $SrCO_3$, $CaCO_3$, $ZrO_2$, $TiO_2$, $MnCO_3$ and $MgCO_3$ powders each having a purity of 99% or more were prepared as starting materials.

Then, the powders of $SrCO_3$, $CaCO_3$, $ZrO_2$ and $TiO_2$ were weight and mixed to obtain a raw material of a main component represented by a formula $(Ca_{1-x}Sr_x)_m(Zr_{1-y}Ti_y)O_3$ where x, y and m are indicated in Table 1. Further, $MnCO_3$ and $MgCO_3$ were weighed and mixed with the above mixture of $SrCO_3$, $CaCO_3$, $ZrO_2$ and $TiO_2$ to obtain a starting material such that the $MnCO_3$ and $MgCO_3$ serve as raw material of accessory components consisting of w mols of MnO and z mols of MgO (shown in Table 1) with respect to 100 mols of the main component. Then, the starting material was put into a ball mill and wet-milled therein, followed by being calcined in air at 1000 to 1200° C. for two hours, thereby obtaining a calcined powder.

In the following Tables, marks * are used to represent ranges other than those of the present invention, while those without marks * are used to represent the ranges of the present invention.

TABLE 1

| Sample No. | x | y | m | w | z |
|---|---|---|---|---|---|
| *1 | 0.50 | 0.70 | 1.00 | 3.0 | 1.0 |
| *2 | 0.20 | 0.60 | 0.90 | 1.0 | 0 |
| *3 | 0.30 | 0.90 | 1.20 | 2.0 | 2.0 |
| *4 | 0.15 | 0.65 | 0.85 | 0 | 1.0 |
| *5 | 0.40 | 0.85 | 1.30 | 0.5 | 1.5 |
| *6 | 0.20 | 0.70 | 1.10 | 0 | 0 |
| *7 | 0 | 0.65 | 1.00 | 7.0 | 0 |
| *8 | 0.10 | 0.80 | 0.95 | 0 | 7.0 |
| *9 | 0.30 | 0.75 | 1.25 | 3.0 | 4.0 |
| 10 | 0 | 0.85 | 0.90 | 0.0 | 0.1 |
| 11 | 0.45 | 0.65 | 1.20 | 4.0 | 1.0 |
| 12 | 0.20 | 0.70 | 0.90 | 0 | 6.0 |
| 13 | 0.15 | 0.80 | 1.25 | 3.0 | 3.0 |
| 14 | 0 | 0.75 | 1.10 | 0.1 | 0 |
| 15 | 0.35 | 0.80 | 1.00 | 6.0 | 0 |

Next, an organic solvent such as polyvinylbutyl based binder and ethanol were mixed with the calcined powder, and were wet-milled sufficiently in a ball mill to thereby obtain a ceramic slurry. Subsequently, the ceramic slurry is formed into a plurality of sheets with the use of the doctor blade method, thereby obtaining a plurality of green sheets 2b each having a rectangular shape and a thickness of 10 μm. After that, an electrically conductive paste 4 mainly containing Ni was printed onto the ceramic green sheets, thus producing electrically conductive paste layers which will then serve as internal electrodes.

Further, a plurality of the ceramic green sheets on which the electrically conductive paste layers have been formed, were laminated together in a manner such that edge portions thereof are arranged alternatively on the side where the electrically conductive paste reaches an edge, thereby obtaining a desired laminated body. The obtained laminated body was then heated to a temperature of 350° C. in an atmosphere of $N_2$ so as to decompose the binder, followed by firing in a reductive atmosphere consisting of $H_2$—$N_2$—$H_2O$ gas, thereby obtaining a sintered ceramic body.

After firing, a silver paste 5 was applied to two opposite end faces of the obtained ceramic sintered body, followed by baking treatment in a $N_2$ atmosphere at 600° C., thereby forming external electrodes which are electrically connected with the internal electrodes. Afterwards, a Ni-plating film 6 is formed on the external electrodes, followed by forming a solder-plating film on said Ni-plating film 7.

The monolithic ceramic capacitor 1 has a width of 1.6 mm, a length of 3.2 mm and a thickness of 1.2 mm, with the thickness of the dielectric ceramic layer 2a being 6 μm. Further, the monolithic ceramic capacitor 1 had 150 effective dielectric ceramic layers 2a in all.

Thereafter, the electric property of the monolithic ceramic capacitor 1 was measured, thus obtaining an electrostatic capacity and a dielectric loss (tan δ) under a condition of 1 KHz, 1 Vrms and 25° C., thereby calculating a dielectric constant (∈) from the electrostatic capacity. Subsequently, D.C. voltage of 25 V was continuously applied to the capacitor under a temperature of 25° C. for 2 minutes, thereby measuring the insulating resistance and thus calculating specific resistance.

Further, under a condition of 1 KHz and 1 Vrms, the variation of the electrostatic capacity with a temperature change was measured, and its rate of change was measured in accordance with the following equation.

$$TC(ppm/°C.) = \{(\in_{85}°C. - \in_{20}°C.)/\in_{20}°C.\} \times \{1/(85°C. - 20°C.)\} \times 10^6$$

In a life test under a high temperature load, samples each including 36 pieces were used and a D.C. voltage of 150 V was applied to these samples under a temperature of 150° C., thereby measuring the variation of insulating resistance with the passing of time. During such test, the time period necessary for the insulating resistance of each sample to become $10^6$ Ω or lower was deemed as the life time, thereby allowing one to obtain an average life time.

The results of the evaluation are shown in Table 2.

TABLE 2

| Sample No. | Sintering temperature (° C.) | Dielectric constant | Dielectric loss (%) | TC (ppm/° C.) | Specific resistance (Ωcm) | Average life (hrs) |
|---|---|---|---|---|---|---|
| *1 | 1300 | 180 | 0.05 | −1200 | >$10^{13}$ | 20 |
| *2 | 1350 | 70 | 0.06 | −800 | >$10^{13}$ | 120 |
| *3 | 1270 | 140 | 0.07 | −1000 | >$10^{13}$ | 10 |
| *4 | 1250 | 110 | 1.00 | −750 | >$10^{13}$ | 5 |
| *5 | 1350 | | | Not sintered | | |
| *6 | 1350 | | | Not sintered | | |
| *7 | 1300 | 150 | 0.03 | −2000 | >$10^{13}$ | 50 |
| *8 | 1350 | 120 | 0.09 | −1500 | >$10^{13}$ | 80 |
| *9 | 1270 | 105 | 0.07 | −1800 | >$10^{13}$ | 70 |
| 10 | 1300 | 110 | 0.05 | −800 | >$10^{13}$ | 150 |
| 11 | 1270 | 140 | 0.10 | −1000 | >$10^{13}$ | 60 |
| 12 | 1270 | 100 | 0.08 | −850 | >$10^{13}$ | 70 |
| 13 | 1320 | 110 | 0.06 | −950 | >$10^{13}$ | 90 |
| 14 | 1300 | 120 | 0.05 | −750 | >$10^{13}$ | 120 |
| 15 | 1270 | 100 | 0.07 | −800 | >$10^{13}$ | 110 |

As understood from Table 2, the monolithic ceramic capacitor obtained by using the anti-reducing dielectric ceramic composition of the present invention has a dielectric constant of 100 or higher, a dielectric loss of 0.1% or lower, and its change rate in electrostatic capacity with a temperature change (TC) is as small as 1000 ppm/° C. Moreover, during a life test under a high temperature load, D.C. voltage of 150 V was applied under a temperature of 150° C., and it was found that the average life time was as long as 50 hours or longer.

Here, an explanation will be given to a reason as to why the composition of the present invention should be limited to the above values.

With respect to the composition formula $(Ca_{1-x}Sr_x)_m(Zr_{1-y}Ti_y)O_3$ ($0 \leq x < 0.5$, $0.60 < y \leq 0.85$, $0.85 < m < 1.30$), if, as in a case of sample No. 1, the value of x is 0.5 or higher, the change rate in electrostatic capacity with temperature change (TC) will become large, and thus its average life will become short. For this reason, it is preferred that the amount of Sr should be controlled within a range of $0 \leq x < 0.5$.

If, as in a case of sample No. 2, the value of y is 0.6 or lower, its dielectric constant will decrease. On the other hand, if, as in a case of sample No. 3, the value of y is larger than 0.85, an average life will become short. For this reason, it is preferred that the amount of Ti should be controlled within a range of $0.60 < y \leq 0.85$.

Further, if, as in a case of sample No. 4, the value of m is 0.85 or lower, dielectric loss will become large and average life will become short. On the other hand, if, as in a case of sample No. 5, the value of m is 1.30 or higher, sinterability will become extremely bad. For this reason, it is preferred that the amount of m should be controlled within a range of $0.85 < m < 1.30$.

Moreover, if, as in a case of sample No. 6, when the content of at least one of MnO and MgO is below 0.1 mol, sinterability will become extremely bad. On the other hand, if, as in the cases of sample Nos. 7 to 9, when content of at least one of MnO and MgO is over 6 mols, the change rate in electrostatic capacity with a temperature change (TC) will become large. For this reason, it is preferred that a manganese compound and a magnesium compound, which are incorporated as an accessory component, should be controlled within a range of about 0.1 to 6 mols with respect to 100 mols of the above main component, by calculatively converting the manganese compound into MnO and the magnesium compound into MgO.

EXAMPLE 2

At first, $SrCO_3$, $CaCO_3$, $ZrO_2$, $TiO_2$, $MnCO_3$ and $MgCO_3$ powders each having a purity of 99% or more were prepared in order to be used as start materials.

Then, appropriate amounts of the above start material powders were taken so as to form a composition which can be represented by $(Ca_{0.8}Sr_{0.2})_{1.05}(Zr_{0.3}Ti_{0.7})O_3$. Then, the prepared start material powders were put into a ball mill and wet-milled therein, followed by being calcined in air at 1000 to 1200° C. for two hours, thereby obtaining a calcined powder material. Further, other start materials which are $MnCO_3$ and $MgCO_3$ were taken and were mixed with the above main component so as to obtain a start material powder such that $MnCO_3$ and $MgCO_3$ used as an accessory component were 0.5 mols of MnO and 1.0 mols of MgO with respect to 100 mols of the main component. Further, the sintering aid agents shown in Table 3 were mixed with the start material powders in the amounts (parts by weight) with respect to 100 parts by weight in all of the above main component and the accessory component.

TABLE 3

| Sample No. | Sintering aid agent (mole ratio) | Added amount (parts by weight) |
|---|---|---|
| 21 | $0.35Li_2O$-$0.50B_2O_3$-$0.15(0.90Si$-$0.10Ti)O_2$ | 25 |
| 22 | $SiO_2$ | 5 |
| 23 | $0.25Li_2O$-$0.65(0.30Si$-$0.70Ti)O_2$-$0.10Al_2O_3$ | 1 |
| 24 | $0.66SiO_2$-$0.17TiO_2$-$0.15BaO$-$0.02MnO$ | 0.1 |
| 25 | $0.45SiO_2$-$0.22TiO_2$-$0.28BaO$-$0.05Al_2O_3$ | 10 |
| 26 | $0.35Li_2O$-$0.50B_2O_3$-$0.15(0.90Si$-$0.10Ti)O_2$ | 3 |
| 27 | $0.35Li_2O$-$0.15B_2O_3$-$0.45(0.30Si$-$0.70Ti)O_2$-$0.05ZrO_2$ | 6 |
| 28 | $0.70B_2O_3$-$0.15Al_2O_3$-$0.10BaO$-$0.03ZnO$-$0.02MnO$ | 20 |

With the use of the above start material powders, monolithic ceramic capacitors were prepared and their electric properties measured using the same method as in Example 1, with the measured results shown in the following Table 4.

TABLE 4

| Sample No. | Sintering temperature (° C.) | Dielectric constant | Dielectric loss (%) | TC (ppm/° C.) | Specific resistance (Ωcm) | Average life (hrs) |
|---|---|---|---|---|---|---|
| 21 | 950 | 100 | 1.50 | −900 | >$10^{13}$ | 20 |
| 22 | 1100 | 110 | 0.05 | −830 | >$10^{13}$ | 80 |
| 23 | 1150 | 110 | 0.06 | −850 | >$10^{13}$ | 90 |
| 24 | 1150 | 120 | 0.05 | −900 | >$10^{13}$ | 60 |
| 25 | 1050 | 100 | 0.08 | −810 | >$10^{13}$ | 55 |
| 26 | 1070 | 120 | 0.08 | −880 | >$10^{13}$ | 100 |
| 27 | 980 | 110 | 0.07 | −780 | >$10^{13}$ | 75 |
| 28 | 950 | 100 | 0.10 | −950 | >$10^{13}$ | 50 |

As understood from the cases of sample Nos. 22 to 28 in the Table 4, the monolithic ceramic capacitor obtained by using the anti-reducing dielectric ceramic composition of the present invention has a dielectric constant of 100 or higher, a dielectric loss of 0.1% or lower, and its change rate in electrostatic capacity with a temperature change (TC) is as small as 1000 ppm/° C. or lower (absolute value). During a life test under a high temperature load, D.C. voltage of 150 V was applied under a temperature of 150° C., and it was found that the average life was as long as 50 hours or longer. By incorporating the sintering auxiliary materials, it is possible to conduct the sintering treatment at a temperature of 1150° C. or lower. On the other hand, if the content of a sintering auxiliary material is larger than about 20 parts by weight, the dielectric loss will become large as in a case of sample No. 21, and its average life will become short. For this reason, it is preferred that the content of a sintering auxiliary material be controlled at about 20 parts by weight or lower with respect to 100 parts by weight of the main component and the accessory component.

As can be clearly understood from the above description, the monolithic ceramic capacitor formed by using the dielectric ceramic composition of the present invention, has a dielectric constant of 100 or higher and an excellent reliability during the life measuring test under a high temperature load. Therefore, the dielectric ceramic composition of the present invention can be used as a condenser material for temperature compensation, and can be used as a dielectric resonator material for microwave, thereby ensuring a high value for industrial use.

What is claimed is:

1. An anti-reducing dielectric ceramic composition comprising a ceramic represented by the formula $$(Ca_{1-x}Sr_x)_m(Zr_{1-y}Ti_y)O_3$$

in which $0 \leq x < 0.5$, $0.60 < y \leq 0.85$ and $0.85 < m < 1.30$ as a main component, and at least one member selected from the group consisting of a manganese compound and a magnesium compound as an accessory component in a range of about 0.1 to 6 mols in terms of MnO and MgO, respectively, per 100 mols of the main component.

2. The anti-reducing dielectric ceramic composition according to claim 1, wherein said composition further comprises a sintering aid agent.

3. The anti-reducing dielectric ceramic composition according to claim 2, wherein the content of said agent is about 20 parts by weight or lower with respect to 100 parts by weight in total of the main component and the accessory component.

4. The anti-reducing dielectric ceramic composition according to claim 3, wherein said agent contains at least one of Si and B.

5. The anti-reducing dielectric ceramic composition according to claim 2, wherein said agent is selected from the group consisting of (a) $SiO_2$, (b) $Li_2O$—(Si, Ti)$O_2$—MO, (c) $SiO_2$—$TiO_2$—XO (d) $Li_2O$—$B_2O_3$—(Si, Ti)$O_2$ and (d) $B_2O_3$—$Al_2O_3$—XO, wherein MO is at least one of $Al_2O_3$ and $ZrO_2$ and XO is at least one substance selected from the group consisting of BaO, SrO, CaO, MgO, ZnO and MnO.

6. The anti-reducing dielectric ceramic composition according to claim 5, wherein said agent is (c) or (d) and further comprises at least one of $Al_2O_3$ and $ZrO_2$.

7. The anti-reducing dielectric ceramic composition according to claim 4, wherein said agent is $SiO_2$.

8. The anti-reducing dielectric ceramic composition according to claim 4, wherein said agent is $Li_2O$—(Si, Ti)$O_2$—MO where MO is at least one of $Al_2O_3$ and $ZrO_2$.

9. The anti-reducing dielectric ceramic composition according to claim 4, wherein said agent is $SiO_2$—$TiO_2$—XO where XO is at least one substance selected from the group consisting of BaO, SrO, CaO, MgO, ZnO and MnO.

10. The anti-reducing dielectric ceramic composition according to claim 9, wherein said agent is at least one of $Al_2O_3$ and $ZrO_2$.

11. The anti-reducing dielectric ceramic composition according to claim 4, wherein said agent is $Li_2O$—$B_2O_3$—(Si, Ti)$O_2$.

12. The anti-reducing dielectric ceramic composition according to claim 11, wherein said agent further comprises at least one of $Al_2O_3$ and $ZrO_2$.

13. The anti-reducing dielectric ceramic composition according to claim 4, wherein said agent is $B_2O_3$—$Al_2O_3$—XO where XO is at least one substance selected from the group consisting of BaO, SrO, CaO, MgO, ZnO and MnO.

14. The anti-reducing dielectric ceramic composition according to claim 1, wherein $0 \leq x \leq 0.45$, $0.65 \leq y \leq 0.85$ and $0.90 \leq m \leq 1.25$.

15. In a monolithic ceramic capacitor comprising a plurality of dielectric ceramic layers, internal electrodes between the dielectric ceramic layers and external electrodes electrically connected with the internal electrodes, said dielectric ceramic layers being the dielectric ceramic composition of claim 1 and said internal electrodes comprise a base metal.

16. The monolithic ceramic capacitor as claimed in claim 15, wherein said base metal is nickel or copper.

17. In a monolithic ceramic capacitor comprising a plurality of dielectric ceramic layers, internal electrodes between the dielectric ceramic layers and external electrodes electrically connected with the internal electrodes, said dielectric ceramic layers being the dielectric ceramic composition of claim 3 and said internal electrodes comprise a base metal.

18. The monolithic ceramic capacitor as claimed in claim 17, wherein said base metal is nickel or copper.

19. In a monolithic ceramic capacitor comprising a plurality of dielectric ceramic layers, internal electrodes between the dielectric ceramic layers and external electrodes electrically connected with the internal electrodes, said dielectric ceramic layers being the dielectric ceramic composition of claim 5 and said internal electrodes comprise a base metal.

20. The monolithic ceramic capacitor as claimed in claim 19, wherein said base metal is nickel or copper.

* * * * *